United States Patent [19]

Harano et al.

[11] Patent Number: 4,748,516
[45] Date of Patent: May 31, 1988

[54] INPUT/OUTPUT DEVICE FOR IMAGE READING AND PRINTING

[75] Inventors: Tetsuo Harano, Inazawa; Eiichi Ohta, Handa, both of Japan

[73] Assignee: Brother Kogyo Kabushiki Kaisha, Japan

[21] Appl. No.: 839,205

[22] Filed: Mar. 12, 1986

[30] Foreign Application Priority Data

Mar. 15, 1985 [JP] Japan ............................... 60-52949
Apr. 26, 1985 [JP] Japan ............................... 60-91806

[51] Int. Cl.$^4$ ............................................... H04N 1/04
[52] U.S. Cl. ................................... 358/296; 358/286; 358/293
[58] Field of Search ............... 358/296, 285, 286, 280, 358/293, 302; 346/76 PH, 139 R

[56] References Cited

U.S. PATENT DOCUMENTS 4,596,995  6/1986  Yamakawa et al. ............ 358/302 X
4,636,871  1/1987  Oi ........................................ 358/296

*Primary Examiner*—Clifford C. Shaw
*Attorney, Agent, or Firm*—Parkhurst & Oliff

[57] ABSTRACT

An input/output device including a reading and a printing head of reciprocating shuttle type for reading and printing of images on respective first and second media. The reading head has reading portions spaced apart along the width of the first medium at a pitch greater than a desired reading pitch, while the printing head has printing portions spaced apart along the width of the second medium at a pitch greater than a desired printing pitch. The printing and reading heads are reciprocated as a unit along the width of the media to effect reading and printing with desired reading resolution and printing density, with the reading head pressed on the first medium, and with the printing portions pressed on the second medium. The input/output device comprises an actuator for selectively effecting either separation of the reading and printing heads from the first and second media, respectively, or pressed contact of the reading and printing heads with the media, respectively.

20 Claims, 9 Drawing Sheets

INPUT/OUTPUT DEVICE FOR IMAGE READING AND PRINTING

BACKGROUND OF THE INVENTION

1. Field of the Art

The present invention relates to an input/output device having a reading head for reading image information on a recording medium, and a printing head for printing image information such as the images read by the reading head.

2. Related Art Statement

Various input/output devices of the type indicated above are known. An example of such an input/output device is proposed in U.S. Pat. No. 4,652,743.

The input/output device disclosed in the above-identified patent includes: an optical reading head and a thermal printing head, both of reciprocating shuttle type; drive means for reciprocating the reading and printing heads as a unit; and a detector or sensor for detecting reading and printing positions. A pitch of the reading positions and a pitch of the printing positions are determined by desired reading resolution and printing density, respectively. The reading or printing head of the reciprocating shuttle type is characterized in that a plurality of reading or printing portions (such as the reading ends of optical fibers of an optical reading head, or heat-generating elements of a thermal printing heads) are spaced apart from each other over substantially the entire width of the recording medium, at a pitch greater than the pitch of the reading or printing positions corresponding to a desired reading resolution or printing density. With the reading and printing heads reciprocated as a unit, images on a first medium are read by the reading head at the detected reading positions, while the images read by the reading head are printed on a second medium by the printing head, at the corresponding printing positions detected.

PROBLEM SOLVED BY THE INVENTION

In the input/output device indicated above, the reading and printing heads of the reciprocating shuttle type are held in sliding pressed contact with the surfaces of the respective recording media, while the heads are reciprocated for reading and printing operations. This arrangement suffers a considerably high sliding resistance of the heads with respect to the recording media. Therefore, an accordingly high load is applied to a drive motor for reciprocating the reading and printing heads, resulting in relatively high energy consumption by the input/output device.

However, the reading and printing operations by the reading and printing heads are not always required to be performed simultaneously. For instance, the printing head may be operated alone, in response to signals from a built-in keyboard or from an external source. Alternatively, the images read by the reading head may be printed after the images have been read and stored in a memory. In these cases, it is not necessary to hold both of the printing and reading heads in pressed contact with the respective recording media while the two heads are reciprocated as a unit. In this respect, the proposed input/output device suffers unnecessary energy consumption due to unnecessarily increased resistance of sliding of the heads on the recording media.

SUMMARY OF THE INVENTION

It is therefore an object of the present invention to provide an input/output device for reading and printing images, which has means for minimizing a sliding resistance of its reading and printing shuttle heads with respect to the recording media, thereby avoiding an unnecessary increase of a load applied to a head reciprocating drive, and a consequent waste of energy.

According to the present invention, there is provided an input/output device, capable of reading first images on a surface of a first recording medium, and printing second images such as said first images, on a surface of a second recording medium, comprising: (a) a reading head of a reciprocating shuttle type having a plurality of reading portions for reading the first images on the first recording medium, the plurality of reading portions being spaced apart from each other in a direction perpendicular to a line of feed of the first recording medium, at a predetermined pitch greater than a reading pitch corresponding to a predetermined reading resolution of the reading head, so as to cover an entire width of the first recording medium, the reading head being adapted to be in pressed contact with the surface of the first recording medium while the first images are read by the plurality of reading portions; (b) a printing head of a reciprocating shuttle type having a plurality of printing portions adapted to be in pressed contact with the surface of the second recording medium for printing thereon the second images, the plurality of printing portions being spaced apart from each other in a direction perpendicular to a line of feed of the second recording medium, at a predetermined pitch greater than a printing pitch corresponding to a predetermined printing density of the print head, so as to cover an entire width of the second recording medium; (c) driving means for reciprocating the reading head and the printing head as a unit in the direction; (d) detecting means for detecting, during reciprocation of the reading and printing heads, reading positions of the reading head at the reading pitch, and printing positions of the printing head at the printing pitch; and (e) actuator means for selectively effecting either separation of the reading and printing heads from the surfaces of the first and second recording media, respectively, or pressed contact of the reading and printing heads with the surfaces, respectively.

In the input/output device of the invention constructed as described above, the reciprocating shuttle reading head is reciprocated to effect a reading operation while being pressed on the first recording medium. Similarly, the reciprocating shuttle printing head is reciprocated to effect a printing operation while its printing portions are pressed on the second recording medium. However, when the reading and printing heads are not required to perform reading and printing operations simultaneously, that is, when only one of the two heads is operated, the actuator means is operated to release the other head away from the surface of the corresponding recording medium, to avoid an unnecessary increase in sliding resistance of the reading and printing heads, and an uncessary increase in load to be applied to the driving means for reciprocating the heads, whereby the energy consumption by the present input/output device is minimized.

According to one embodiment of the invention, the reading head has a separator disposed near said plurality of reading portions to maintain a clearance between the reading portions and the surface of the first recording medium.

According to another embodiment of the invention, the printing head is operated to print said second images according to signals received from an external device.

According to a further embodiment of the invention, the printing head is operated to print as said second images said first images which are read by said reading head. Preferably, the input/output device has a reading/printing mode in which both of the reading and printing heads are operated simultaneously.

According to a further embodiment of the invention, the first recording medium is fed along a first path which passes the reading portions of the reading head but does not pass the printing portions of the printing head, while the second recording medium is fed along a second path which passes the printing portions but does not pass the the reading portions. According to an alternative embodiment, the first and second recording media are fed along a first and a second path, respectively, which paths pass both of the reading portions and the printing portions.

According to a still further embodiment of the invention, the actuator means comprises a presser member which is movable so as to press the first recording medium onto the reading head, and releasing means for releasing the presser member away from the reading head. According to a yet further embodiment of the invention, the actuator means comprises a presser member which is movable so as to press the second recording medium onto the plurality of printing portions, and releasing means for releasing the presser member away from the plurality of printing portions.

In accordance with yet another embodiment of the invention, the actuator means comprises: a first presser member movable so as to press the first recording medium onto the reading head; first releasing means for releasing the first presser member away from the reading head; a second presser member movable so as to press the second recording medium onto the plurality of printing portions; and second releasing means for releasing the second presser member away from the plurality of printing portions.

In one advantageous arrangement of the above embodiment, the first releasing means comprises a first movable member for moving the first presser member between an operative position to press the first recording medium onto the reading head, and an inoperative position to permit the first recording medium to be separated from the reading head. The second releasing means comprises a second movable member for moving the second presser member between an operative position to press the second recording medium onto the plurality of printing portions, and an inoperative position to permit the second recording medium to be separated from the plurality of printing portions. The actuator means further comprises a common cam engaging the first and second movable members, and a drive device for driving the common cam.

In one form of the above arrangement, the first movable member is a bellcrank lever supported pivotally about an axis. The bellcrank lever has a first arm engaging the common cam, and a second arm engaging the first presser member.

In another form of the above arrangement, the second movable member is a pivotable arm which is supported pivotally about an axis and which has a first and a second portion disposed away from the axis. The first portion engages the common cam, and the second portion supports the second presser member.

According to yet another embodiment of the invention, the input/output device further comprises a carriage which supports the reading and printing heads and which is reciprocated by the driving means.

In accordance with a further embodiment, at least one of the plurality of reading portions and at least one of the plurality of printing portions corresponding to the at least one of the reading portions are disposed on at least one straight line substantially parallel to the lines of feed of the first and second recording media. Preferably, the above-indicated at least one of the reading portions comprises one of the reading portions which is located at one of opposite ends of a row of the reading portions, and the above-indicated at least one of the printing portions comprises one of the printing portions which is located at one of opposite ends of a row of the printing portions, which one end corresponding to the above-indicated one end of the row of the reading portions. More preferably, all reading portions and all corresponding printing portions are disposed on respective straight lines which are substantially parallel to the lines of feed of the recording media.

BRIEF DESCRIPTION OF THE DRAWINGS

The above and other objects, features and advantages of the present invention will be better understood from reading the following detailed description of preferred embodiments of the invention, when considered in connection with the accompanying drawing, in which.

DETAILED DESCRIPTION OF THE PREFERRED EMBODIMENTS

Referring first to FIGS. 1 through 6C, one embodiment of an input/output device of the present invention will be described in detail.

Figure 1:
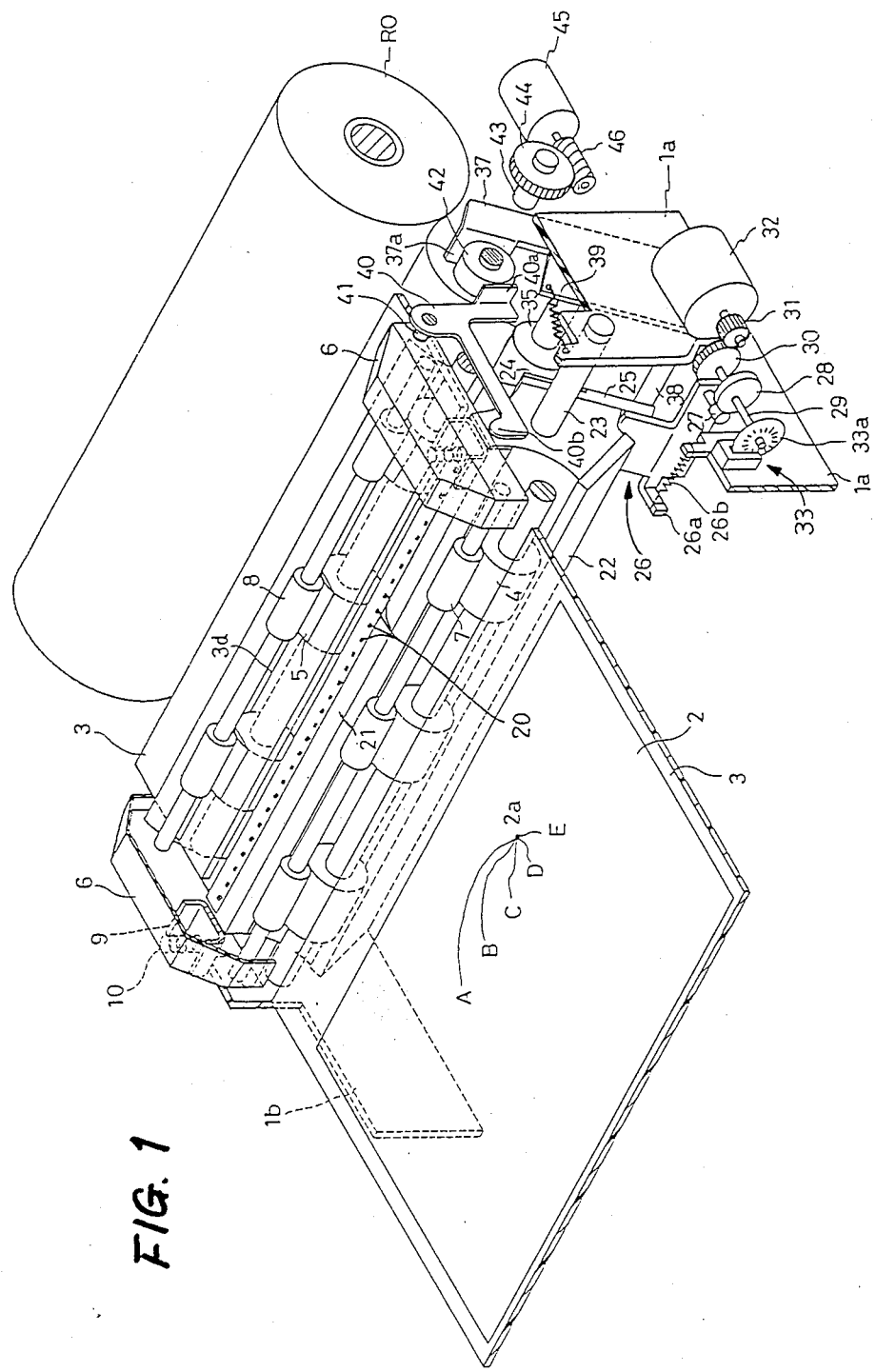
FIG. 1 is a perspective view of one embodiment of an input/output device of the present invention.
Figure 2:
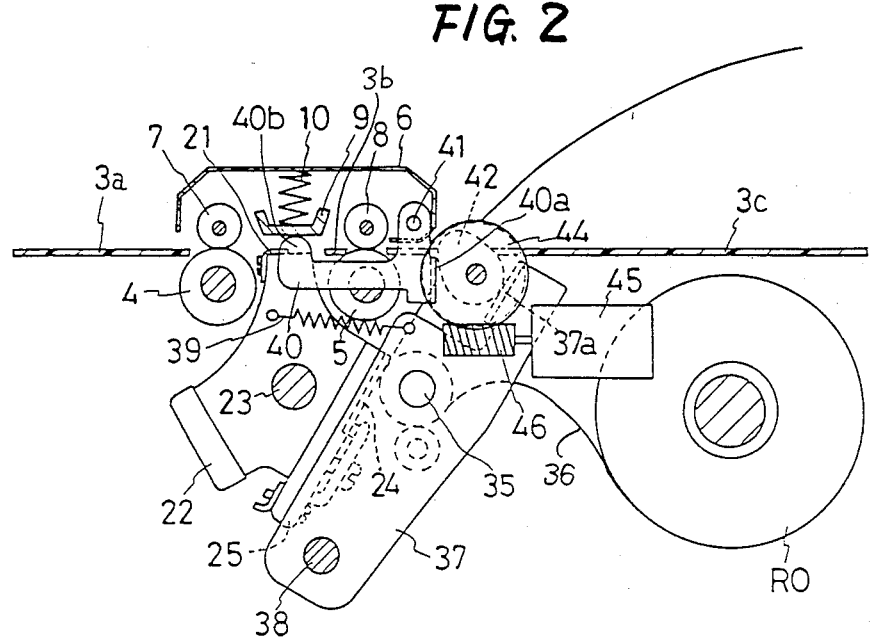
FIG. 2 is a fragmentary side elevational view in cross section of the input/output device of FIG. 1.
Figure 3A:
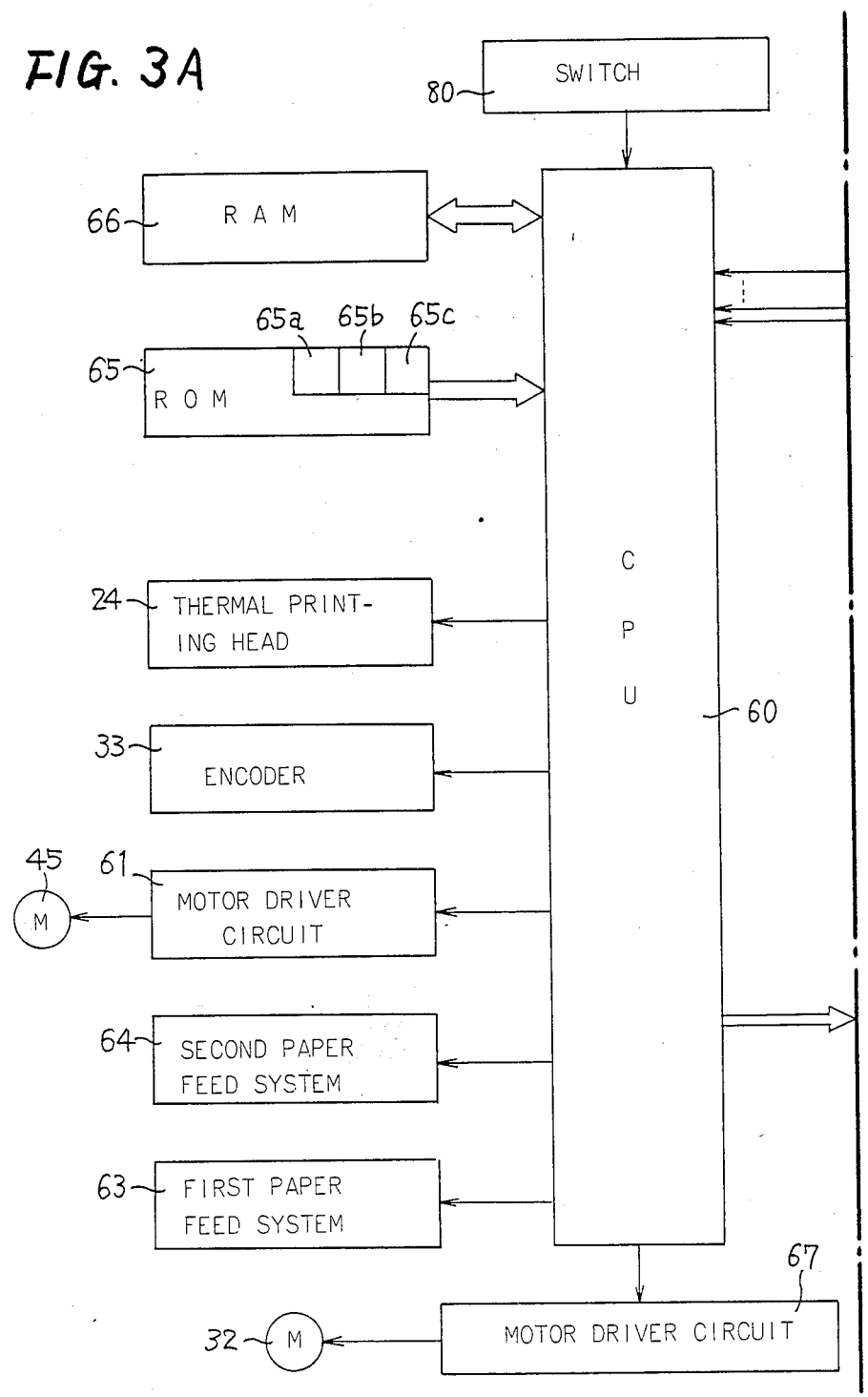
FIGS. 3A and 3B are block schematic diagrams showing a control system of the input/output device.
Figure 3B:
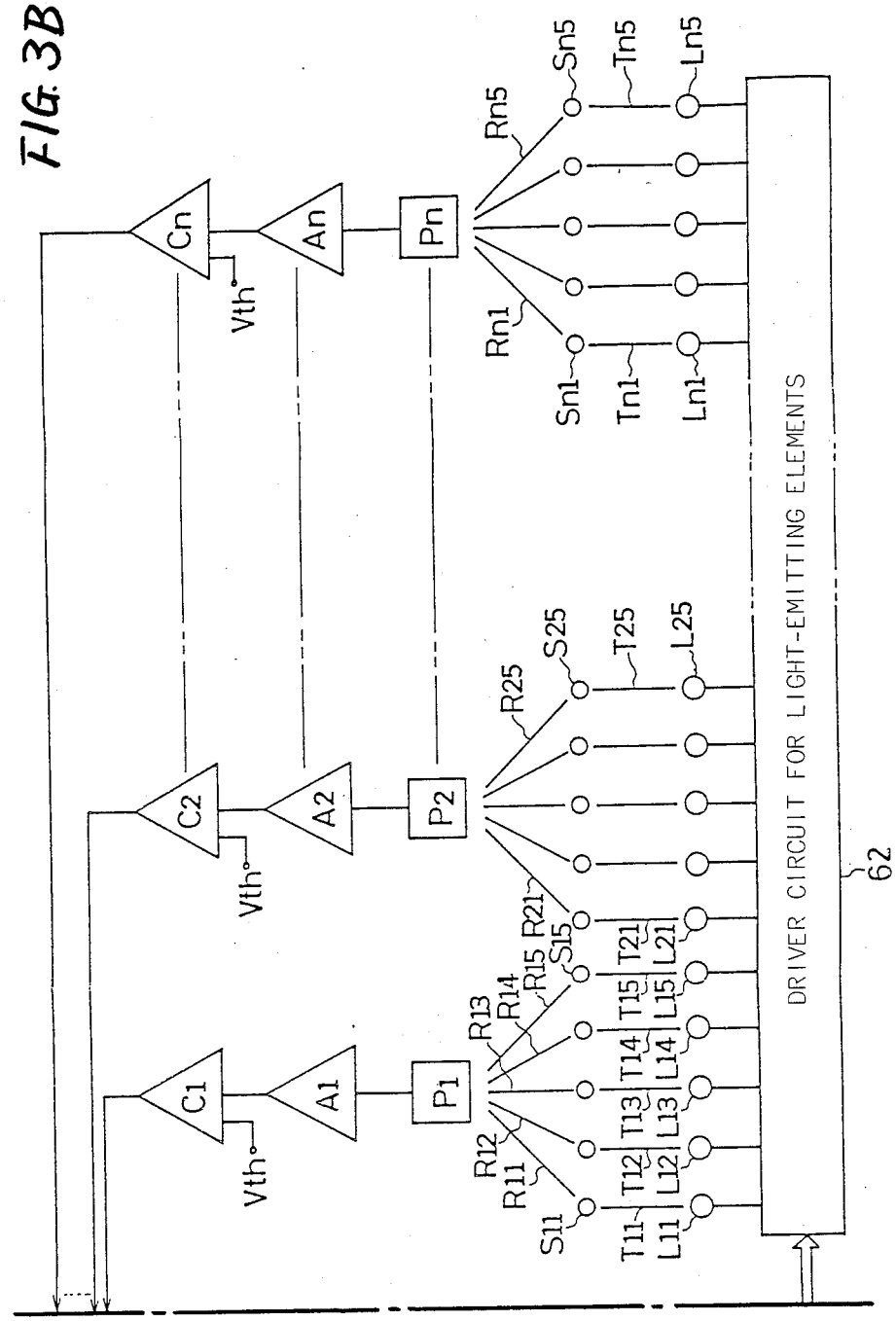

The input/output device has a right and a left frame 1a, 1b, as shown in FIG. 1. On these frames 1a, 1b there is mounted a paper holder plate 3 for supporting and guiding a first recording medium 2. As indicated in FIG. 2, the paper holder plate 3 consists of three separate sections 3a, 3b and 3c which are arranged in a direction of feed of the recording medium 2, such that a row of reading portions 20 of a reading head 22 (which will be described) is located between the sections 3a and 3b. Below the paper holder plate 3 are disposed two arrays of paper feed rolls 4, 5 for feeding the first recording medium 2 along a first paper path from the front side (left side in FIG. 2) toward the rear side of the input-/output device. The feed rolls 4, 5 are driven by a first paper feed system 63 (FIG. 3). The row of reading portions 20 is covered by a covering member 6 disposed above the paper holder plate 3. The covering member 6 is supported pivotally about a shaft 41 which extends between the right and left frames 1a, 1b. The covering member 6 is pivotable between its closed position, and its open position in which the reading portions 20 are exposed. Two arrays of presser rolls 7, 8 are rotatably supported by the covering member 6, so that the presser rolls 7, 8 cooperate with the feed rolls 4, 5, respectively, to nip the first recording medium 2, when the covering member 6 is placed in its closed position. Therefore, the recording medium 2 can be fed without slack or warpage, when the feed rolls 4, 5 are driven by the first paper feed system 63 while the covering member 6 is held in its closed position.

The covering member 6 is equipped with an elongate presser member 9 disposed therein so as to extend over the entire width of the first recording medium 2. The presser member 9, which has a generally U shape in transverse cross section, is biased downward by springs 10 interposed between the top wall of the covering member 6 and the opposite bottom wall of the presser member 9.

The previously indicated reading head 22 having the reading portions 20 is an optical reading head of a reciprocating shuttle type slidably supported on a shaft 23 which is supported by the frames 1a, 1b. The shaft 23 extends through the reading head 22 so that the head 22 is slidable on the shaft 23 in a direction perpendicular to the line of feed of the first recording medium 2. On the rear side of the generally elongate optical reading head 22, there is mounted a thermal printing head 24 secured via a radiator plate 25 with screws.

The reading head 22 has a bracket 26 attached to its lower right end portion. The bracket 26 has an arm 26a, and a cam follower 27. The reading head 22 is biased toward the right frame 1a by a spring 26b which is connected between the arm 26a of the bracket 26 and the right frame 1a.

The right frame 1a rotatably supports a shaft 29 to which a cam 28 is secured. With a biasing force of the spring 26b, the cam 28 is held in pressed rolling contact with the cam follower 27. The shaft 29 is rotated by a head reciprocating drive motor 32, through a first gear 30 mounted on the shaft 29 for simultaneous rotation therewith, and a second gear 31 which is mounted on an output shaft of the drive motor 32 and which meshes with the first gear 30. The drive motor 32 is connected via a motor driver circuit 67 to a central processing unit 60 (hereinafter referred to as "CPU 60").

With the drive motor 32 driven under the control of the CPU 60, the second gear 31 on the output shaft of the motor 32 is rotated, whereby the first gear 30 meshing with the second gear 31 is rotated to rotate the shaft 29. Thus, the cam 28 is rotated. A rotary motion of the cam 28 engaging the cam follower 27 will cause the cam follower 27 to be pushed toward the left frame 1b. As a result, the reading head 22 is moved against a biasing force of the spring 26b, in the same direction from the right frame 1a toward the left frame 1b. After the cam 28 has been rotated through a given angle, the leftward movement of the reading head 22 is stopped. Subsequently, the cam 28 allows the reading head 22 to be moved in the reverse direction, that is, to the right toward the right frame 1a, by the biasing force of the spring 26b. Thus, the reciprocating shuttle reading head 22 is reciprocated in the direction perpendicular to the line of feed of the first recording medium 2.

Similarly, the thermal printing head 24 mounted on the reading head 22 is reciprocated together with the reading head 22. Thus, the drive motor 32, first and second gears 30, 31, cam 28, cam follower 27 and spring 26b cooperate to constitute driving means for reciprocating the reading and printing heads 22, 24 as a unit along the width of the recording medium 2, i.e., in the direction perpendicular to the line of feed of the medium 2.

A rotary movement of the shaft 29 is detected by an encoder 33 which comprises a rotary disk 33a mounted on the shaft 29, and a light-emitting element and a light-sensitive element which constitute a photoelectric detector. This photoelectric detector, which is well known in the art, is disposed in the proximity of the rotary disk 33a. The rotary disk 33a has a plurality of slits which are formed in spaced-apart relation with each other in the circumferential direction of the disk. The photoelectric sensor of the encoder 33 produces a timing signal when each of the slits in the rotary disk 33a passes the photoelectric sensor during rotation of the rotary disk 33a, i.e., of the cam 28. The timing signal is applied to the central processing unit 60, as indicated in FIG. 3. During rotation of the cam 28, the encoder 33 detects an angular displacement of the rotary disk 33a and consequently of the cam 28. Thus, the photoelectric detector constitutes detecting means for detecting reading positions of the reading head 22 which are located at a predetermined reading pitch corresponding to a desired reading resolution of the head 22, and detecting printing positions of the printing head 24 which are located at a predetermined printing pitch which is equal to the reading pitch and which corresponds to a desired printing density.

The timing signals from the encoder 33 are also used by the CPU 60 to detect rates of movement of the reading and printing heads 22, 24.

Inside the right and left frames 1a, 1b, there are provided a pivotable member in the form of a pair of third frames 37 which rotatably support a generally elongate platen 35 such that the platen 35 extends along the thermal printing head 24 for holding a second recording medium 36 supplied from a paper roll RO. The third frames 37 are connected to each other by a shaft 38 rotatably supported by the side frames 1a, 1b, so that the third frames 37 are pivotable about the shaft 38. The third frames 37 are biased by a spring 39 connected between the right frame 1a and the corresponding right third frame 37. Under a biasing action of the spring 39, a bent portion 37a formed at an upper part of the right third frame 37 is normally held in pressed engagement with the periphery of a cam 42 which will be described.

The cam 42 is fixed to a shaft 43 which is connected to a gear 44. The gear 44 meshes with a worm gear 46 secured to a drive motor 45. The motor 45 is connected via a motor driver circuit 61 to the CPU 60. With the drive motor 45 operated to rotate the cam 42 with its periphery engaging the bent portion 37a of the right third frame 37, the third frames 37 are pivoted about the shaft 38, in the clockwise direction (in FIG. 2) against a biasing action of the spring 39 to move the platen 35 to its inoperative position, or in the counterclockwise direction under a biasing action of the spring 39, to move the platen 35 to its operative position of FIG. 2. In the inoperative position, the platen 35 is spaced away from the printing head 24 whereby the second recording medium 36 supplied from the paper roll RO is separated from the printing head 24. In the operative position, the platen 35 holds the second recording medium 36 in pressed contact with the printing head 24.

Adjacent to the cam 42 is disposed a generally L-shaped bellcrank lever 40 for pushing up the movable presser member 9. The bellcrank lever 40 has a first arm with a bent portion 40a, and a second arm with a tab 40b. The bellcrank lever 40 is fixed to one end of the previously indicated shaft 41. The lever is pivotable about the shaft 41, such that the bent portion 40a engages the previously indicated cam 42 and such that the tab 40b is abutable on the bottom surface of the presser member 9. To the other end of the shaft 41 is fixed a single-arm lever (not shown) having a tab similar to the tab 40b. With the cam 42 rotated with its periphery engaging the bent portion 40a, the bellcrank lever 40 and the single-arm lever are pivoted about the shaft 41 in the clockwise direction (FIG. 2) to move the presser member 9 upward against a biasing force of the springs 10 to its inoperative position, or in the counterclockwise direction under the biasing action of the springs 10, to permit the presser member 10 to be moved to its operative position. In the inoperative position, the presser member 10 is spaced away from the first recording medium 2. In the operative position, the presser member 10 holds the first recording medium 2 in pressed contact with the surface of a separator member 21 (which will be described).

The periphery of the cam 42 is profiled so that the cam 42 has: a reading-mode position in which the presser member 9 is placed in the operative position while the platen 35 is placed in the inoperative position; a printing-mode position (of FIG. 2) in which the presser member 9 is placed in the inoperative position while the platen 35 is in its operative position; and a reading/printing-mode position in which the presser member 9 and the platen 35 are both placed in their operative position. It will be understood that the periphery cam 42, bellcrank lever 40, third frames 37, spring 39, worm gear 46, gear 44, drive motor 45, etc. cooperate to constitute actuator means for moving the presser member 10 and platen 35 between their operative and inoperative positions, that is, for selectively effecting either separation of the reading and printing heads 22, 24 from the surfaces of the first and second recording media 2, 36, respectively, or pressed contact of the heads 22, 24 with the recording media 2, 36, respectively.

The second recording medium 36 from the paper Roll RO supported behind the instant input/output device is fed along a second paper path when the platen 35 is rotated by means of a second paper feed system 64 (FIG. 3) which is operated under the control of the CPU 60.

The rearmost section 3c of the paper holder plate 3 has a slot 3d which is located downstream of the printing head 24 in the direction of feed of the second recording medium 36 along the second paper path. The printed portion of the recording medium 36, which has passed the slot 3d, is fed onto the rearmost section 3c of the paper holder plate 3.

As illustrated in FIG. 3, the optical reading head 22 includes: a plurality of light-sensitive elements P1–Pn; sets of light-emitting elements Ln1–Ln5, corresponding to the light-sensitive elements P1–Pn, each set consisting of five elements Ln1–Ln5; corresponding sets of light-emitting optical fibers Tn1–Tn5 for transmitting light beams from the light-emitting elements Ln1–Ln5 to respective reading spots Sn1–Sn5 on the first recording medium 2; corresponding sets of light-receiving optical fibers Rn1–Rn5 for transmitting light beams reflected by the reading spots Sn1–Sn5, to the light-sensitive elements P1–Pn; a plurality of amplifiers A1–An for amplifying outputs of the respective light-sensitive elements P1–Pn; and a plurality of comparators C1–Cn for comparing the outputs of the amplifiers A1–An with a predetermined threshold or reference value Vth, and applying their outputs to the CPU 60. The light-emitting elements Ln1–Ln5 are connected to a driver circuit 62 which is controlled by the CPU 60. The driver circuit 62 activates one (Lni) of the five light-emitting elements Ln1–Ln5 of each set Ln, so that the five elements Ln1–Ln5 of each set emit a suitable amount of light, in a predetermined order.

To the CPU 60 are connected a read-only memory 65 (hereinafter referred to as "ROM 65") and a random-access memory 66 (hereinafter referred to as "RAM 66"). The ROM 65 stores various control programs and data tables for controlling the instant input/output device. The RAM 66 is adapted to store various signals which include the outputs of the comparators C1–Cn. Namely, image information representative of images 2a on the first recording medium 2 are stored in the RAM 66.

The light beam produced by each light-emitting element Lni (i=1, 2, 3, 4, 5) in response to a signal from the driver circuit is transmitted through the corresponding light-emitting optical fiber Tni and emitted to irradiate the corresponding reading spot Sni. The light beam reflected by the reading spot Sni is received by the corresponding light-receiving optical fiber Rni and transmitted to the corresponding light-sensitive element Pn. The output of the light-sensitive element Pn, which corresponds to an amount of the received reflected light, is applied to the amplifier An. The output of the light-sensitive element Pn increases with the brightness and consequently with the light reflectance of the reading spot Sni. The output of the amplifier An, which is proportional to the output of the light-sensitive element Pn, is applied to the comparator Cn. When the output of the amplifier An received by the comparator Cn is higher than the reference value Vth, a high-level signal is fed to the CPU 60. When the output of the amplifer An is lower than the reference value Vth, the comparator Cn applies a low-level signal to the CPU 60. Namely, the low-level signal is produced by the comparator Cn when the light reflectance of the reading spot Sni is relatively low, while the high-level signal is produced when the light reflectance of the reading spot Sni is relatively high. Thus, the image information representative of the light reflectance of the reading spot Sni is fed to the CPU 60, whereby a fraction of an image (2a) if any in the reading spot Sni can be read.

In the above-described manner, all of the five light-emitting elements Ln1–Ln5 of each set Ln are sequentially activated and the outputs of the appropriate comparators Cn are applied to the CPU 60, while the reading head 22 is fed in the direction of width of the first recording medium 2. Thus, a line of information along the width of the recording medium 2 is read. This reading operation (which will be described in greater detail) by the reading head 22 of a reciprocating shuttle type is effected at a higher speed than a reading operation by an ordinary optical head of a serial reading type. Further, the reading head 22 is more economical to manufacture than a reading head of a type in which an entire line of information is read at one time without a shuttle movement.

Figure 4:
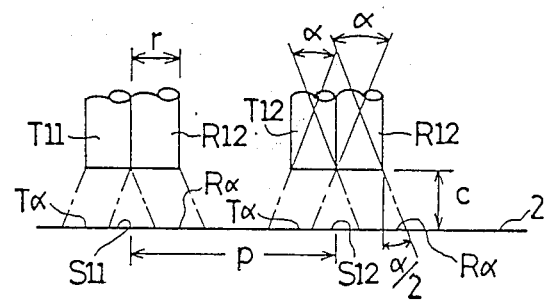
FIG. 4 is an illustration showing reading portions of a reading head, indicating the positions of the ends of light-emitting and light-receiving optical fibers, in relation to reading spots on a recording medium.

The optical fibers Tni and Rni are fixed on the reading head 15 such that their first ends are positioned opposite to the surface of the first recording medium 2, as indicated in FIG. 4. Described more specifically, the first ends of the light-emitting optical fibers Tni are located adjacent to the first ends of the corresponding light-receiving optical fibers Rni. The first ends of each pair of the corresponding light-emitting and light-receiving optical fibers Tni and Rni form each reading portion 20. The first end of each optical fiber Tni, Rni has an angle $\alpha$ of radiation or incidence of light which is determined by a material of the fiber. The light beam emitted from the first end of the optical fiber Tni irradiates a circular illumination spot T$\alpha$ indicated in broken line in FIG. 4. In the meantime, the first end of the corresponding light-receiving optical fiber Rni receives the light beam which is reflected from the circular reflection spot R$\alpha$ indicated in broken line in the same figure. The size of these illumination and reflection spots T$\alpha$ and R$\alpha$ is determined by the radiation or incidence angle $\alpha$, a diameter r of the fiber Tni, Rni and a clearance c between the end of the fiber Tni, Rni and the surface of the recording medium 2. The illumination and reflection spots T$\alpha$ and R$\alpha$ overlap each other in an overlapping spot which forms the previously indicated reading spot Sni on the medium 2. The reading spot Sni, which is indicated by a circle in broken line in FIG. 5B, is read by the corresponding reading portion 20 (ends of a pair of optical fibers Tni, Rni). Obviously, the diameter of the reading spot Sni depends upon the above-indicated clearance c. To maintain this clearance c and consequently the diameter of the reading spot Sni, the previously indicated separator member 21 (FIG. 1) is provided so as to extend along and near the row of the reading portions 20 of the reading head 22. The thickness of this separator member 21 is determined so as to provide the suitable clearance c. As indicated in FIG. 5C, the diameter of the reading spot Sni is equal to a reading pitch 1/N which corresponds to a desired reading resolution of the reading head 22. Hence, the thickness of the separator member 21 and the clearance c are determined to obtain the reading pitch 1/N.

Therefore, it will be understood that the clearance c established by the thickness of the separator member 21 has a significant effect on the reading pitch 1/N of the reading head 22. To this end, the recording medium 2 should be pressed by the presser member 9 against the surface of the separator member 21.

The reading portions 20 of the reading head 22 which are constituted by the first ends of the optical fibers Tni, Rni, are arranged in a row perpendicular to the line of feed of the recording medium 2, as indicated in FIG. 1. A pitch p of the reading portions 20 (spacing between the adjacent reading portions 20) is determined by the following formula (1):

$$p = a/N - 1/xN \tag{1}$$

where,
a: number of the reading spots Sni which are formed by each reading portion 20 while the reading head 22 is moved its predetermined stroke in the direction of width of the medium 2

1/N: diameter of the reading spot Sni (N = number of the reading spots Sni per unit distance x: number of the light-receiving optical fibers Rni connected to each light-sensitive element Pn In the above arrangement, the reading head 22 is capable of reading a line of information (a row of the reading spots Sni as shown in FIG. 5C) while the reading head 22 is moved by the drive motor 32 in the direction of width of the recording medium 2. As previously described, the reading positions at which the reading spots Sni are read by the appropriate reading portions 22 are detected by the detector in the form of the encoder 33. The manner of reading by the reading head 22 is described in detail in U.S. Pat. No. 4,652,743. However, the specific manner of reading by this reciprocating shuttle reading head 22 is not essential for the understanding of the present invention.

Figure 5A:
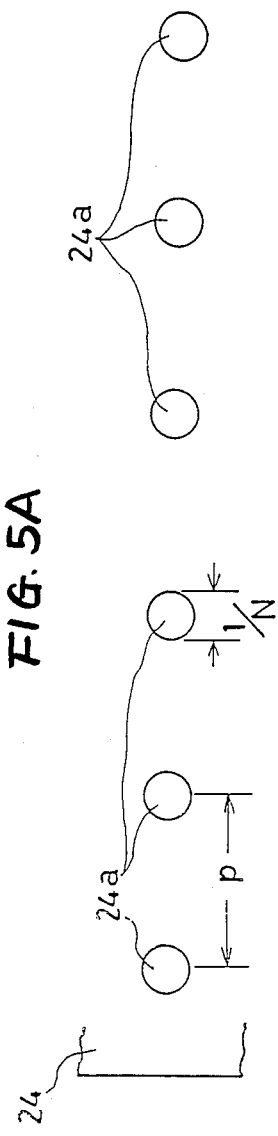
FIG. 5A is an illustrative front view of a thermal printing head of the input/output device, indicating the arrangement of printing portions.
Figure 5B:
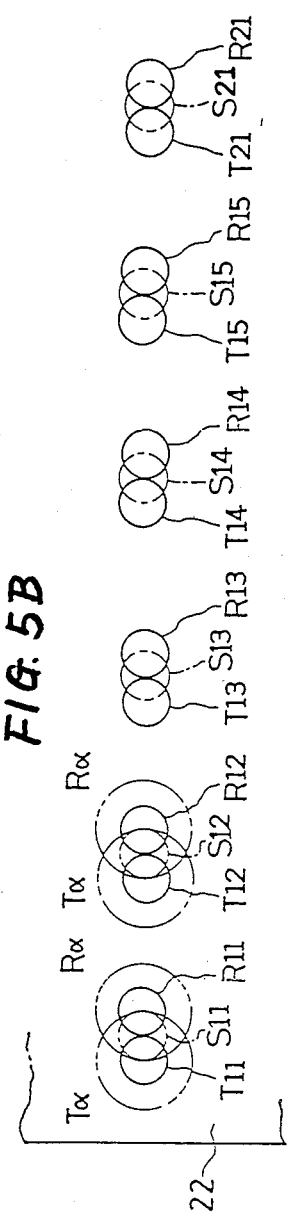
FIG. 5B is an illustrative view of the reading head, indicating the arrangement of reading portions.
Figure 5C:
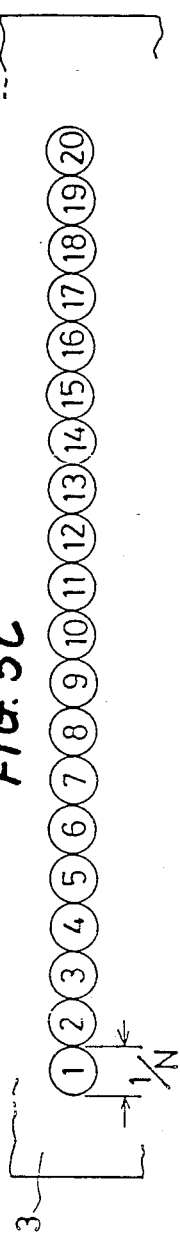
FIG. 5C is an illustration showing a row of reading spots on the recording medium.

FIG. 5A illustrates printing portions 24a (heat-generating elements) of the thermal printing head 24 which are arranged in a row in mutually spaced-apart relation, in the direction of width of the second recording medium 36. During printing, the recording medium 36 is held in pressed contact with the printing portions 24a. The printing portions 24a are spaced from each other at a pitch p equal to the pitch of the reading portions 20 of the reading head 22. The diameter of each printing portion 24a is equal to the diameter 1/N of the reading spot Sni. In this arrangement, the printing by the printing head 24 can be accomplished in the same manner as the reading by the reading head 22. The encoder 33 serves also as detecting means for detecting the printing positions.

As indicated in FIG. 3, a selector switch 80 is connected to the CPU 60. This switch 80 has three positions for selecting three modes of operation of the instant input/output devices. With the switch 80 placed in a first position, the device is operable in a reading mode as an image reader. In a second position, the device is operable in a printing mode as a printer. When the switch 80 is placed in a third position, the device is operable in a reading/printing mode as a copier, wherein reading and printing of images are effected concurrently.

Figure 6A:
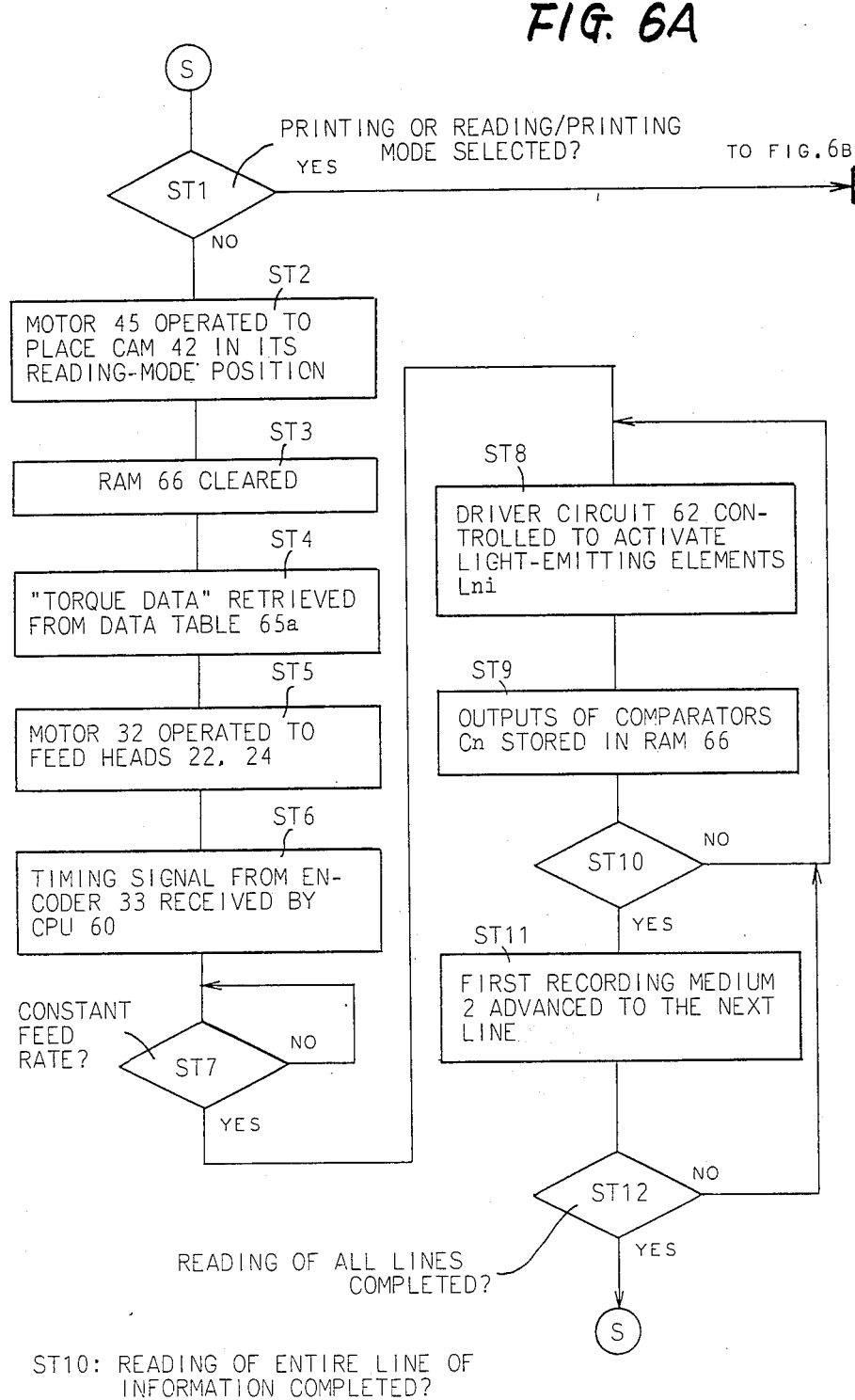
FIGS. 6A, 6B and 6C are flow charts illustrating operations of the input/output device.
Figure 6B:
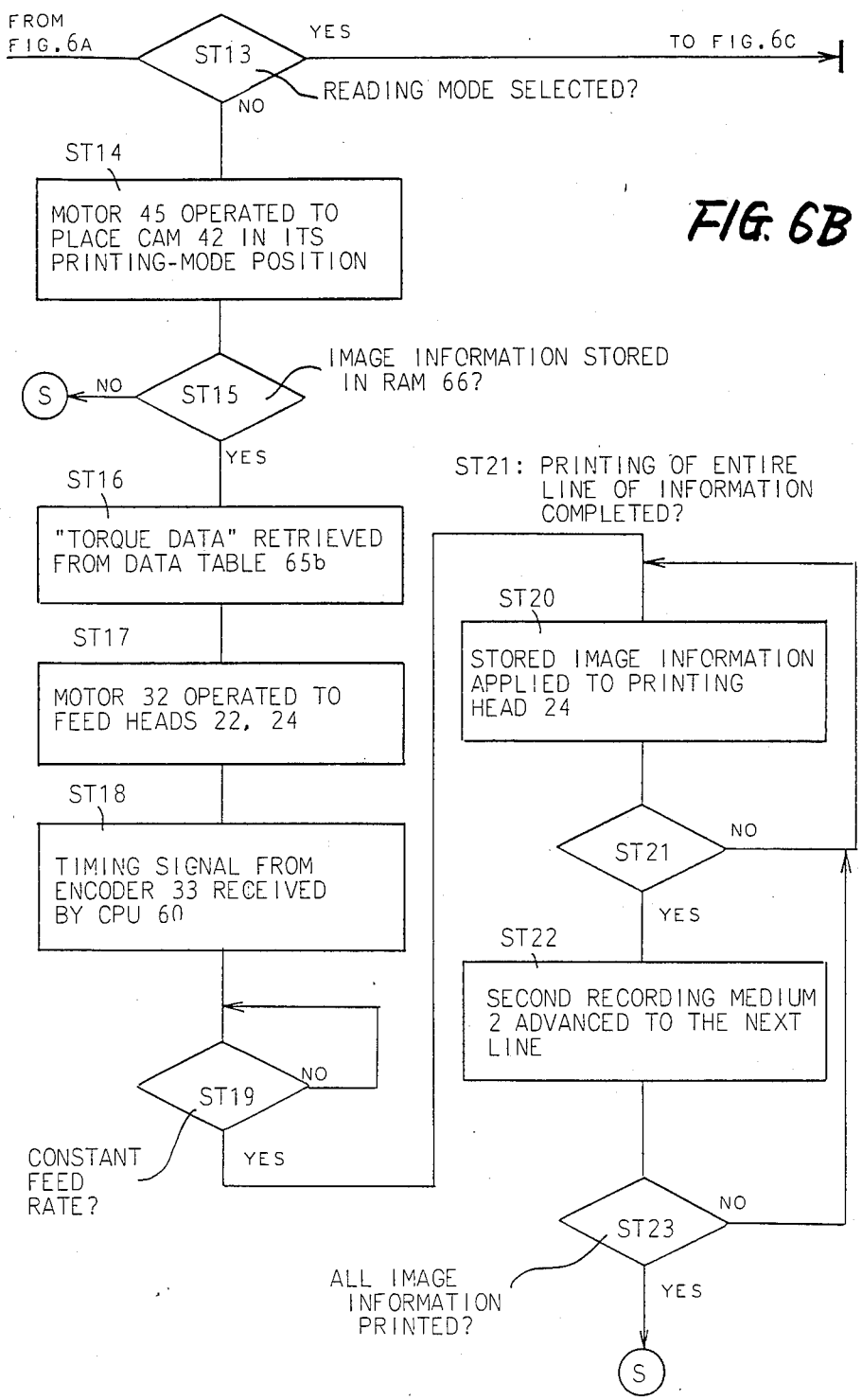
Figure 6C:
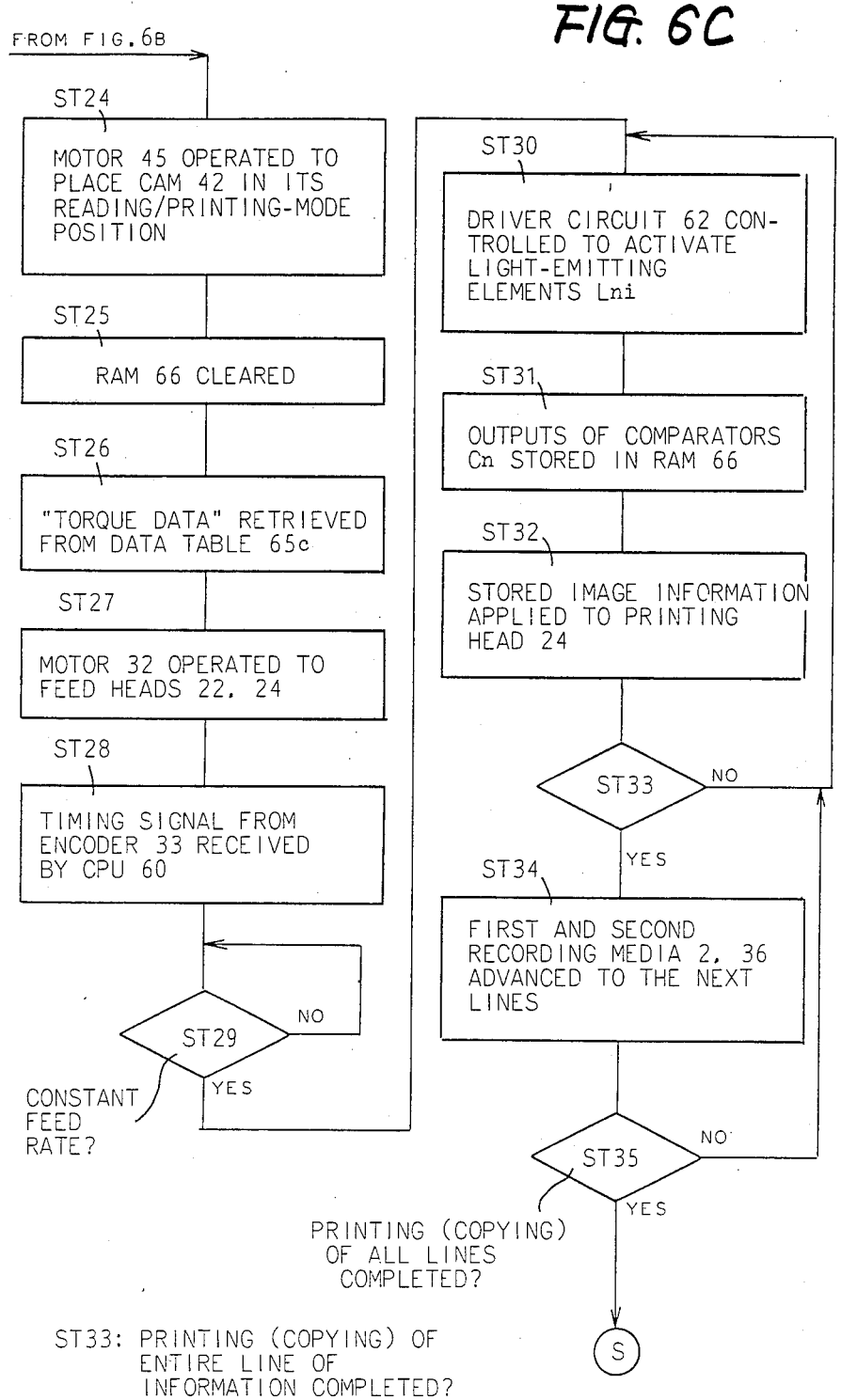

Referring next to the flow charts of FIGS. 6A, 6B and 6C, the operation of the input/output device will be described.

In response to a signal from the selector switch 80, the CPU 60 checks the selected mode of operation, i.e., reading mode, printing mode or reading/printing mode. This checking is achieved in steps ST1 and ST13.

In step ST1, the CPU 60 checks if the input/output device is placed in the printing mode or reading/printing mode. If neither the printing mode nor the reading/printing mode is established, that is, if the reading mode is established, step ST1 is followed by step ST2 wherein the drive motor 45 is operated to place the cam 42 in its reading-mode position. In this condition, the first recording medium 2 is pressed against the surface of the separator member 21, but the second recording medium 36 is held separated from the printing portions 24a.

Successively, step ST3 is executed to clear the RAM 66, whereby image information stored in the RAM 66 is erased. Now, the RAM 66 is ready to store image information of the images 2a on the first recording medium 2.

Step ST3 is followed by step ST4 wherein the CPU 60 retrieves appropriate torque data (which will be described) from a torque data table 65a of the ROM 65, in order to operate the head reciprocating drive motor 32 at a predetermined speed. The ROM 65 has two other torque data tables 65b and 65c. These torque data tables 65a, 65b, 65c are prepared based on experimental data. The torque data table 65a is used when the input-/output device is placed in the reading mode (reader mode) in which only the first recording medium 2 is held in pressed contact with the reading head 22. The torque data table 65b is used in the printing mode (printer mode) in which only the second recording medium 36 is held in pressed contact with the printing portions 24a of the printing head 24. The torque data table 65c is used in the reading/printing mode (copier mode) in which the first and second recording media 2, 36 are held in pressed contact with the reading and printing heads 22, 24, respectively. In the reading, printing, and reading/printing modes of the input/output device, the cam 42 is placed in the previously described reading-mode, printing-mode and reading/printing-mode positions, respectively, as described later in more detail. It will be understood that a torque of the drive motor 32 necessary to move the reading head 22 (with the printing head 24) is smaller in the reading mode (in which the platen 35 is separated from the printing head 24), than in the reading/printing mode (wherein the platen 35 and the presser member 9 are placed in their operative positions and the recording media 2, 36 are pressed on the reading and printing head 22, 24).

Successively, the CPU 60 goes to step ST5 to apply the retrieved torque data to the motor driver circuit 67, and operate the drive motor 32 according to the torque data, whereby the reading and printing heads 22, 24 are reciprocated in the direction perpendicular to the line of feed of the recording media 2, 36.

Step ST5 is followed by step ST6 in which the CPU 60 receives the timing signal from the encoder 33, and thereby detects a feed rate of the heads 22, 24. Then, the CPU 60 executes step ST6 to check if the feed rate of the heads 22, 24 has reached a predetermined constant level.

When the checking in step ST7 reveals that the feed rate has been raised to the predetermined level, the CPU 60 goes to step ST8 wherein the driver circuit 62 is controlled to activate the first light-emitting element Ln1 (n=1, 2, 3, 4, 5) of each set Ln of the five light-emitting elements Lni, based on the timing signal from the encoder 33.

Subsequently, the CPU 60 goes to step ST10 to check if an entire line of information has been read, or not. If not, the CPU 60 repeats steps ST8 and ST9 to activate the second one (Ln2) of the five light-emitting elements Lni of each set Ln. The steps ST8 and ST9 are thus repeated until the last one (Ln5) of the five elements Lni of each set Ln has been activated and the output of the corresponding comparator Cn has been stored in the RAM 66.

The manner of reading the entire line of information by activation of the light-emitting elements Lni of each set Ln is described in the previously-identified co-pending Application.

If the judgement in step ST10 is affirmative (YES), step ST10 is followed by step ST11 in which the first paper feed system 63 is operated to advance the first recording medium 2 to the next line.

Then, the CPU 60 goes to step ST12 to check if all lines of information on the recording medium 2 have been read. If not, the CPU 60 repeats steps ST8 through ST11 to read the current line of information. In this way, all lines of information are read. If the judgement in step ST12 is affirmative, the CPU 60 returns to step ST1.

If the checking in step ST1 reveals that the printing mode or reading/printing mode is selected, step ST1 is followed by step ST13 to check if the reading/printing mode is selected or not.

If the reading/printing mode is not selected, namely, if the printing mode is selected, the CPU 60 goes to step ST14 wherein the drive motor 45 is operated to place the cam 42 in its printing mode position in which the presser member 9 is separated from the separator member 21 while the platen 35 is placed in its operative position.

Step ST14 is followed by step ST15 to check if image information is stored in the RAM 66. If not, the CPU 60 returns to START indicated at S in FIG. 6A.

If image information is stored in the RAM 66, the CPU 60 goes to step ST16 to retrieve the torque data from the torque data table 65b in the ROM 65. In this printing mode in which the first recording medium 2 is not held pressed on the separator member 21, a torque of the drive motor 32 necessary to feed the reading and printing heads 22, 24 is smaller than in the reading/printing mode.

Then, the CPU 60 goes to step ST17 to apply the retrieved torque data to the motor driver circuit 67, and thereby operate the drive motor 32 according to the torque data, whereby the reading and printing heads 22, 24 are fed in the direction perpendicular to the line of feed of the recording medium 36.

Step ST17 is followed by step ST18 in which the CPU 60 receives the timing signal from the encoder 33, and thereby detects a feed rate of the heads 22, 24. Successively, the CPU 60 executes step ST19 to check if the feed rate of the printing head 24 (reading head 22) has reached a predetermined constant level.

If the judgement in step ST19 is affirmative, the CPU 60 goes to step ST20 to retrieve the image information from the RAM 66 and apply the retrieved data to the printing head 24, in response to the timing signal from the encoder 33. The printing head 24 effects a printing operation on the second recording medium 36, in a manner similar to that of the image reading by the reading head 22.

Subsequently, the CPU 60 goes to step ST21 to check if an entire line of information has been printed, or not. If not, the CPU 60 repeats step ST17 until the entire line of information has been printed. When the judgement in step ST21 has become affirmative (YES), step ST21 is followed by step ST22 to activate the second paper feed system 64, and thereby feed the second recording medium 36 to the next line.

Then, the CPU 60 goes to step ST23 to check if all lines of information (all image information stored in the RAM 66) have been printed. If not, the CPU 60 repeats steps ST20 through ST23 to print the current line of information. In this way, all lines of information are printed. If the judgement in step ST23 is affirmative, the CPU 60 returns to START.

If the checking in step ST13 reveals that the reading/printing mode is selected, step ST13 is followed by step ST24 in which the drive motor 45 is operated to place the cam 42 in its reading/printing-mode position. In this position of the cam 42, the presser member 9 and the platen 35 are pressed against the separator member 21 and the printing portions 24a of the printing head 24, respectively.

Then, the CPU 60 goes to step ST25 in which the RAM 66 is cleared, and becomes ready to store image information to be read by the reading head 22.

Step ST25 is followed by step ST26 wherein the CPU 60 retrieves the torque data from the torque data table 65c in the ROM 65. Since the first and second recording media 2, 36 are held in pressed contact with the reading and printing heads 22, 24 in the reading/printing mode, the torque data used in the reading/printing mode represents a larger torque of the drive motor 32, than that used in the reading or printing mode.

Step ST26 is followed by step ST27 in which the motor driver circuit 67 is activated to activate the drive motor 32 for feeding the reading and printing heads 22, 24 along the width of the media 2, 36.

Successively, the CPU 60 goes to step ST28 to receive the timing signal from the encoder 33, and then to step ST29 to check if the feed rate of the heads 22, 24 has been raised to the predetermined value. Step ST29 is followed by step ST30 in which the driver circuit 62 is controlled to activate the light-emitting element Lni of each set Ln. This step ST30 is similar to the previously described step ST8. Then, the CPU 60 goes to step ST31 in which the outputs of the comparators Cn are stored in the RAM 66. As soon as the outputs of the comparators Cn, i.e., image information has been stored in the RAM 66, the image information is applied to the thermal printing head 24. In this embodiment, the heads 22, 24 are fed at a lower rate in the reading/printing mode, than in the reading or printing mode.

Step ST32 is followed by step ST33 in which the CPU 60 checks if an entire line of information has been printed on the second recording medium 36, namely, has been copied from the first recording medium 2 onto the second recording medium 36. If not, the CPU 60 repeats steps ST30, ST31, ST32 and ST33 until the entire line has been copied. Upon completion of the copying of the entire line of information, the CPU 60 goes to step ST34 wherein the first and second paper feed systems 63, 64 are activated to advance the first and second recording media 2, 36 to the next lines, respectively.

Then, the CPU 60 goes to step ST35 to check if all lines of information on the first recording medium 2 have been copied onto the second recording medium 36. If not, the CPU 60 repeats steps ST30 through ST34, until all lines have been copied. When all lines have been copied, the CPU 60 returns to START.

As described hitherto, the platen 35 is placed in its inoperative position to separate the second recording medium 36 from the printing portions 24 of the thermal printing head 24, when the input/output device is operated in the reading mode. Similarly, the presser member 9 is placed in its inoperative position to prevent the first recording medium 2 from being pressed against the separator member 21, when the input/output device is operated in the printing mode. In this arrangement, a sliding resistance of the reading and printing heads 22, 24 with respect to the surfaces of the recording media 2, 36 is reduced, whereby a torque of the drive motor 32 necessary to feed the reading and printing heads 22, 24 is accordingly reduced. Thus, the required energy consumption of the device is minimized. In the present embodiment, the printing portions 24a of the printing head 24 are protected against wear by a wear-resistant layer. The instant arrangement for selective separation of the platen 35 from the printing portions 24a serves to prolong the life expectancy of the wear-resistant layer.

Figure 7:
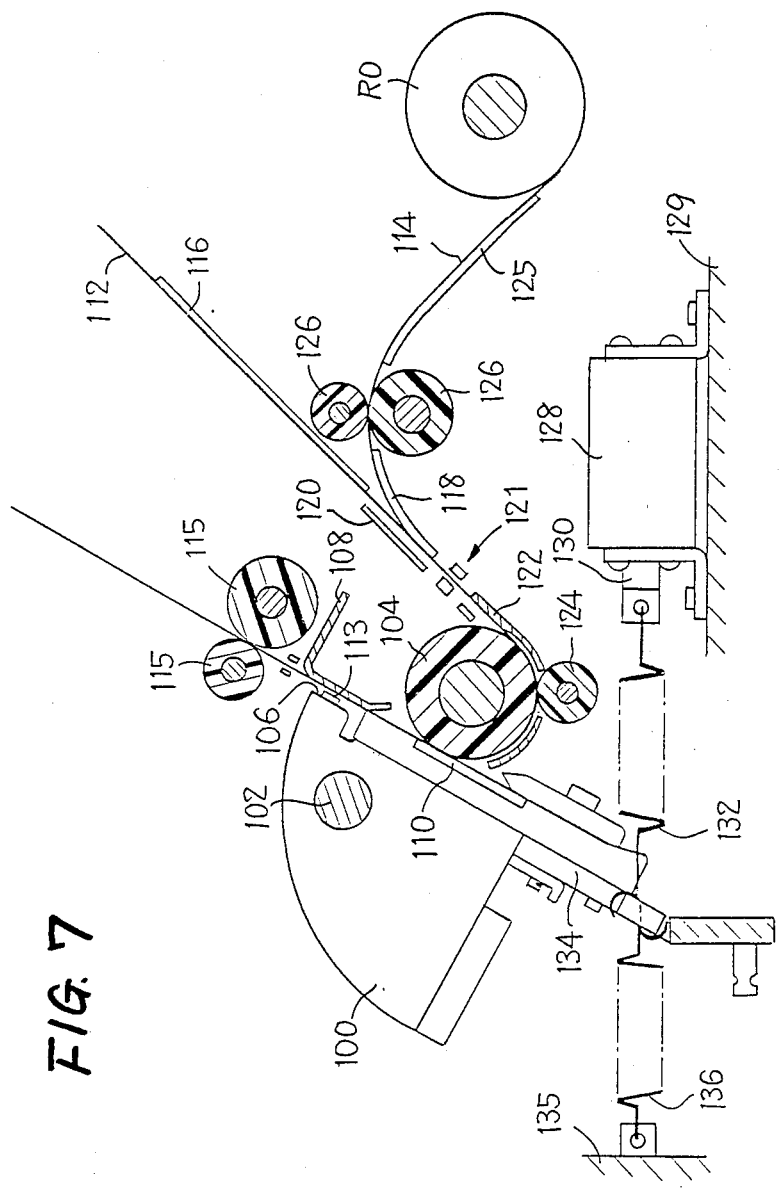
FIG. 7 is a fragmentary side elevational view in cross section of another embodiment of the invention.

Referring next to FIG. 7, there will be described a modified embodiment of the invention which is adapted to selectively perform a reading operation or a printing operation.

In the present modified embodiment, an optical reading head 100 is supported pivotally about a shaft 102 which extends parallel to a platen 104. The reading head 100, which has a generally sectorial transverse cross sectional shape, has a row of reading portions 106 which are arranged in a row opposite to a paper holder 108 disposed above the platen 104. A thermal printing head 110 is attached to the reading head 100, such that the printing head 110 is located opposite to the surface of the platen 104, and is spaced a suitable distance away from the reading portions 106 of the reading head 100, along a common paper path for a first and a second recording media 112, 114. That is, the printing head 110 is positioned downstream of the reading portions 106 in a direction of feed of the recording media 112, 114.

The above-indicated common paper path is defined by the platen 104; the printing head 110; the paper holder 108; an elongate protrusion 113 formed on the reading head 100 such that the protrusion 113 extends parallel to and near the row of the reading portions 106; and a pair of guide rolls 115 which are supported above the reading head 110 and driven so as to nip the recording media 112, 114.

The protrusion 113 is provided to maintain a suitable clearance between the reading portions 106 and the surface of the first recording medium 112 while a reading operation by the reading portions 106 is performed on the medium 112 nipped between the protrusion 113 and the paper holder 108.

The first recording medium 112, which has images to be read by the reading portions 106, is fed along a first paper inlet path leading to the common paper path. This first inlet path is defined by: a support plate 116 and guide plates 118, 120, which are disposed above the platen 104; a photoelectric paper detector 121; the platen 104; and a paper guide 122 disposed along the periphery of the platen 104. A presser roll 124 is rotatably supported so as to cooperate with the platen 104 to nip and feed the recording media 112, 114 when the platen 110 is rotated by a suitable drive motor (not shown).

In the meantime, the second recording medium 114 is supplied from a paper roll RO, and is fed along a second paper inlet path leading to the common paper path indicated above. The second inlet path is defined by a guide plate 125 disposed so as to extend from the paper roll RO; and a pair of guide rolls 126 supported and driven so as to nip the second recording medium 114, between the guide plates 125 and 118.

The pivotally supported reading head 100 is pivotable between a reading position and a printing position. In the reading position, the elongate protrusion 113 holds the first recording medium 112 against the paper holder 108. In the printing position, the printing head 110 is held in pressed contact with the second recording medium 114 placed over the platen 104. The reading and printing positions are selected by controlling a solenoid 128 secured to a stationary member 129 of the input/output device. More specifically, the solenoid 128 has a plunger 130 which is operable between an advanced position and a retracted position. The plunger 130 is connected by a first coil spring 132 to an end portion of a bracket 134 which is fixed to the reading head 100 such that its end portion is located a suitable distance away from the axis of the pivot shaft 102 of the reading head 100. Meanwhile, the end portion of the bracket 134 is connected by a second coil spring 136 to a stationary member 135 of the input/output device. For reasons which will be apparent, a biasing force of the first coil spring 132 is selected to be greater than that of the second coil spring 136.

While the plunger 130 is placed in the retracted position of FIG. 7 with the solenoid 128 held on, the reading head 100 is held in its printing position of FIG. 7 by the biasing force of the first coil spring 132, against the biasing force of the second coil spring 136. In this printing position, the printing head 110 is held in pressed contact with the second recording medium 114 if inserted between the platen 104 and the head 110. In this printing position, however, the protrusion 113 near the reading portions 106 is separated from the paper holder 108, whereby the reading portions 106 do not contact the second recording medium 114 when a printing operation is effected on the medium 114.

When the solenoid 128 is turned off, the plunger 130 is moved to its advanced position. As a result, the reading head 100 is pivoted in the clockwise direction (in FIG. 7) to its reading position, by the biasing force of the second coil spring 136. In this reading position, the protrusion 113 forces the first recording medium 112 against the paper holder 108, if the medium 112 exists between the protrusion 113 and the paper holder 108. However, the printing head 110 is separated from the platen 104.

From the foregoing description, it will be understood that the solenoid 128, first and second coil springs 132, 136, etc. cooperate to constitute actuator means for pivoting the reading head 100 between the reading and printing positions, namely, actuator means for selectively pressing the protrusion 113 or the printing head 110 against the respective recording medium 112, 114. Thus, the present modified embodiment has the same advantages as offered by the preceding embodiment.

In the present embodiment wherein the reading and printing heads 100, 110 are reciprocated by suitable driving means similar to that of the preceding embodiment, the reading portions 106 of the reading head 100 which are arranged in a row parallel to the platen 104 are aligned with corresponding printing portions (not shown) of the printing head 110, in the direction of feed of the recording media 112, 114. In other words, each reading portion 106 and the corresponding printing portion are disposed on a straight line parallel to the line of feed of the media 112, 114. In this arrangement, the images read by the reading head 100 can be printed at the same positions by the printing head 110, in the direction of width of the recording media 112, 114. However, it is possible that only the leftmost or rightmost, or central one of the reading portions 106 is substantially aligned with the corresponding leftmost or rightmost printing portion of the printing head 110. This arrangement is advantageous, for example, when it is desired to enlarge the images read by the reading portions 106 when the read images are printed by the printing head 110. In this case, the pitch of the reading portions 106 is different from that of the printing portions of the printing head 110. The above-indicated complete or partial alignment of the reading and printing portions is also preferred in the preceding embodiment of FIGS. 1–3.

While the invention has been described in its preferred embodiments, it is to be understood that the invention is by no means confined to the precise disclosure contained herein, but may be otherwise embodied.

For example, the first embodiment may be modified to pivot the reading head 22 about the shaft 23, between its reading and printing positions, as in the second embodiment of FIG. 7. In this instance, however, the simultaneous reading and printing positions, as in the second embodiment of FIG. 7. In this instance, however, the simultaneous reading and printing operation can not be achieved.

Further, the second embodiment may be modified such that the paper holder 108 and the platen 104 are movable between an operative and an inoperative position, as in the first embodiment.

It will be obvious to those skilled in the art that various other changes and modifications may be made in the invention, without departing from the spirit and scope of the invention defined in the appended claims.

What is claimed is:

1. An input/output device, capable of reading first images on a surface of a first recording medium, and printing second images such as said first images, on a surface of a second recording medium, comprising:
    a reading head of a reciprocating shuttle type having a plurality of reading portions for reading said first images on said first recording medium, said plurality of reading portions being spaced apart from each other in a direction perpendicular to a line of feed of said first recording medium, at a perdetermined pitch greater than a reading pitch corresponding to a predetermined reading resolution of said reading head, so as to cover an entire width of said first recording medium, said reading head being adapted to be in pressed contact with said surface of said first recording medium while said first images are read by said plurality of reading portions;
    a printing head of a reciprocating shuttle type having a plurality of printing portions adapted to be in pressed contact with said surface of said second recording medium for printing thereon said second images, said plurality of printing portions being spaced apart from each other in a direction perpendicular to a line of feed of said second recording medium, at a predetermined pitch greater than a printing pitch corresponding to a predetermined printing density of said pring head, so as to cover an entire width of said second recording medium;
    driving means for reciprocating said reading head and said printing head as a unit in said direction;
    detecting means for detecting, during reciprocation of said reading and printing heads, reading positions of said reading head at said reading pitch, and printing positions of said printing head at said printing pitch;
    control means for controlling said reading and printing heads responsive to an output of said detecting means; and
    actuator means including first means for effecting separation of said reading head from the surface of said first recording medium and for effecting pressed contact of said reading head with the surface of said first recording medium, and second means, operable independent of said first means, for effecting separation of said printing head from the surface of said second recording medium and for effecting pressed contact of said printing head with the surface of said second recording medium.

2. An input/output device according to claim 1, wherein said printing head is operated to print said second images, according to signals received from an external device.

3. An input/output device according to claim 1, wherein said printing head is operated to print as said second images said first images which are read by said reading head.

4. An input/output device according to claim 3, further comprising control means which has a reading/printing mode in which both of said reading and printing heads are operated simultaneously.

5. An input/output device according to claim 1, wherein said first and second recording media are fed along a first and a second path, respectively, said first path passing said plurality of reading portions but not passing said plurality of printing portions, while said second path passing said plurality of printing portions but not passing said plurality of reading portions.

6. An input/output device according to claim 1, wherein said first and second recording media are fed along a first and a second path, respectively, said first and second paths passing said plurality of reading portions and said plurality of printing portions.

7. An input/output device according to claim 1, wherein said actuator means comprises a presser member which is movable so as to press said second recording medium onto said plurality of printing portions, and releasing means for releasing said presser member away from said plurality of printing portions.

8. An input/output device according to claim 1, further comprising a carriage which supports said reading and printing heads and which is reciprocated by said driving means.

9. An input/output device according to claim 1, wherein one of said plurality of reading portions and one of said plurality of printing portions corresponding to said one of said reading portions are disposed on a straight line substantially parallel to said lines of feed of said first and second recording media, said predetermined pitch of said plurality of reading portions being different from said predetermined pitch of said plurality of printing portions.

10. An input/output device according to claim 9, wherein said one of said reading portions is located at one of opposite ends of a row of said reading portions, and said one of said printing portions is located at a corresponding one of opposite ends of a row of said printing portions.

11. An input/output device according to claim 1, further comprising control means which has a reading mode in which said reading head is operated in pressed contact with the surface of said first recording medium, while said printing head is at rest and spaced apart from the surface of said second recording medium.

12. An input/output device according to claim 1, further comprising control means which has a printing mode in which said printing head is operated in pressed contact with the surface of said second recording medium, while said reading head is at rest and spaced apart from the surface of said first recording medium.

13. An input/output device, capable of reading first images on a surface of a first recording medium, and printing second images on a surface of a second recording medium, comprising:
a reading head of a reciprocating shuttle type having
a plurality of reading portins for reading said first images on said first recording medium, said plurality of reading portions being spaced apart from each other in a direction perpendicular to a line of feed of said first recording medium, at a predetermined pitch greater than a reading pitch corresponding to a predetermined reading resolution of said reading head, so as to cover an entire width of said first recording medium, said reading head being adapted to be in pressed contact with said surface of said first recording medium while the first images are read by said plurality of reading portions;
a printing head of a reciprocating shuttle type having a plurality of printing portions adapted to be in pressed contact with said surface of said second recording medium for printing thereon said second images, said plurality of printing portions being spaced apart from each other in a direction perpendicular to a line of feed of said second recording medium, at a predetermined pitch greater than a printing pitch corresponding to a predetermined printing density of said print head, so as to cover an entire width of said second recording medium;
said predetermined pitch of said plurality of reading portions being different from said predetermined pitch of said plurality of printing portions;
driving means for reciprocating said reading head and said printing head as a unit in said direction;
detecting means for detecting, during reciprocation of said reading and printing heads, reading positions of said reading head at said predetermined pitch of reading resolution, and printing positions of said printing head at said predetermined pitch of printing density; and
control means for controlling said reading and printing heads responsive to an output of said detection means.

14. An input/output device according to claim 13, wherein one of said plurality of reading portions and one of said plurality of printing portions which corresponds to said one of said plurality of reading portions are disposed on a straight line substantially parallel to said lines of feed of said first and second recording media.

15. An input/output device, capable of reading first images on a surface of a first recording medium, and printing second images such as said first images, on a surface of a second recording medium, comprising:
a reading head of a reciprocating shuttle type having
a plurality of reading portions for reading said first images on said first recording medium, said plurality of reading portions being spaced apart from each other in a direction perpendicular to a line of feed of said first recording medium, at a predetermined pitch greater than a reading pitch corresponding to a predetermined reading resolution of said reading head, so as to cover an entire width of said first recording medium, said reading head having a separator disposed near said plurality of reading portions, said separator being adapted to be in pressed contact with said surface of said first recording medium, while maintaining a clearance between said plurality of reading portions and said surface of said first recording medium while said first images are read by said plurality of reading portions;
a printing head of a reciprocating shuttle type having a plurality of printing portions adapted to be in pressed contact with said surface of said second recording medium for printing thereon said second images, said plurality of printing portions being spaced apart from each other in a direction perpendiculr to a line of feed of said second recording medium at a predetermined pitch greater than a printing pitch corresponding to a predetermined printing density of said print head, so as to cover an entire width of said second recording medium;

driving means for reciprocating said reading head and said printing head as a unit in said direction;

detecting means for detecting, during reciprocation of said reading and printing heads, reading positions of said reading head at said reading pitch, and printing positions of said printing head at said printing pitch;

control means for controlling said reading and printing heads responsive to an output of said detecting means; and actuator means for selectively effecting either separation of said reading and printing heads from the surfaces of said first and second recording media, respectively, or pressed contact of said reading and printing heads with said surfaces, respectively.

16. An input-output device, capable of reading first images on a surface of a first recording medium, and printing second images such as said first images, on a surface of a second recording medium, comprising:

a reading head of a reciprocating shuttle type having a plurality of reading portions for reading said first images on said first recording medium, said plurality of reading portions being spaced apart from each other in a direction perpendicular to a line of feed of said first recording medium, at a perdetermined pitch greater than a reading pitch corresponding to a predetermined reading resolution of said reading head, so as to cover an entire width of said first recording medium, said reading head being adapted to be in pressed contact with said surface of said first recording medium while said first images are read by said plurality of reading portions;

a printing head of a reciprocating shuttle type having a plurality of printing portions adapted to be in pressed contact with said surface of said second recording medium for printing thereon said second images, said plurality of printing portions being spaced apart from each other in a direction perpendicular to a line of feed of said second recording medium, at a predetermined pitch greater than a printing pitch corresponding to a predetermined printing density of said print head, so as to cover an entire width of said recording medium;

driving means for reciprocating said reading head and said printing head as a unit in said direction;

detecting means for detecting, during reciprocation of said reading and printing heads, reading positins of said reading head at said reading pitch, and printing positions of said printing head at said printing pitch;

control means for controlling said reading and printing heads responsive to an output of said detecting means; and actuator means for selectively effecting either separation of said reading and printing heads from the surface of said first and second recording media, respectively, or pressed contact of said reading and printing heads with said surfaces, respectively, said actuator means comprising a presser member which is movable so as to press said first recording medium onto said reading head, and releasing means for releasing said presser member away from said reading head.

17. An input-output device, capable of reading first images on a surface of a first recording medium, and printing second images such as said first images, on a surface of a second recording medium, comprising:

a reading head of a reciprocating shuttle type having a plurality of reading portions for reading said first images on said first recording medium, said plurality of reading portions being spaced apart from each other in a direction perpendicular to a line of feed of said first recording medium, at a predetermined pitch greater than a reading pitch corresponding to a predetermined reading resolutin of said reading head, so as to cover an entire width of said first recording medium, said reading head being adapted to be in pressed contact with said surface of said first recording medium while said first images are read by said plurality of reading portions;

a printing head of a reciprocating shuttle type having a plurality of printing portins adapted to be in pressed contact with said surface of said second recording medium for printing thereon said second images, said plurality of printing portions being spaced apart from each other in a direction perpendicular to a line of feed of said second recording medium, at a predetermined pitch greater than a printing pitch corresponding to a predetermined printing density of said print head, so as to cover an entire width of said second recording medium;

driving means for reciprocating said reading head and said printing head as a unit in said direction;

detecting means for detecting, during reciprocation of said reading and printing heads, reading positions of said reading head at said reading pitch, and printing positions of said printing head at said printing pitch;

control means for controlling said reading and printing heads responsive to an output of said detecting means; and actuator means for selectively effecting either separation of said reading and printing heads from the surface of said first and second recording media, respectively or pressed contact of said reading and printing heads with said surfaces, respectively, said actuator means comprising a first presser member movable so as to press said first recording medium onto said reading head, first releasing means for releasing said first presser member away from said reading head, a second presser member movable so as to press said second recording medium onto said plurality of printing portions, and second releasing means for releasing said second presser member away from said plurality of printing portions.

18. An input/output device according to claim 17, wherein said first releasing means comprises a first movable member for moving said first presser member between an operative position to press said first recording medium onto said reading head, and an inoperative position to permit said first recording medium to be separated from said reading head, said second releasing means comprising a second movable member for moving said second presser member between an operative position to press said second recording medium onto said plurality of printing portions, and an inoperative position to permit said second recording medium to be separated from said plurality of printing portions, said actuator means further comprising a common cam engaging said first and second movable members, and a drive device for driving said common cam.

19. An input/output device according to claim 18, wherein said first movable member is a bellcrank lever supported pivotally about an axis, said bellcrank lever having a first arm engaging said common cam, and a second arm engaging said first presser member.

20. An input/output device according to claim 18, wherein said second movable member is a pivotable arm which is supported pivotally about an axis and which has a first and a second portion disposed away from said axis, said first portion engaging said common cam, and said second portion supporting said second presser member.

* * * * *